United States Patent [19]

Zhong

[11] Patent Number: 5,319,552
[45] Date of Patent: Jun. 7, 1994

[54] APPARATUS AND METHOD FOR SELECTIVELY CONVERTING A PHONETIC TRANSCRIPTION OF CHINESE INTO A CHINESE CHARACTER FROM A PLURALITY OF NOTATIONS

[75] Inventor: Xingguo Zhong, Mukou, Japan

[73] Assignee: Omron Corporation, Kyoto, Japan

[21] Appl. No.: 959,653

[22] Filed: Oct. 13, 1992

[30] Foreign Application Priority Data

Oct. 14, 1991 [JP] Japan .................. 3-291960

[51] Int. Cl.⁵ .................................... G06F 15/38
[52] U.S. Cl. .................................... 364/419.09
[58] Field of Search ......................... 364/419.09

[56] References Cited

U.S. PATENT DOCUMENTS

| | | | |
|---|---|---|---|
| 4,698,758 | 10/1987 | Larsen | 364/419.09 |
| 4,951,202 | 8/1990 | Yan | 364/419.09 |
| 5,212,638 | 5/1993 | Bernath | 364/419.09 |

FOREIGN PATENT DOCUMENTS 63-79164 4/1988 Japan .

*Primary Examiner*—Robert A. Weinhardt
*Attorney, Agent, or Firm*—Dickstein, Shapiro & Morin

[57] ABSTRACT

Input according to Pin Yin notation and input according to Zhu Yin notation are allowed. Input data in the Pin Yin notation and input data in the Zhu Yin notation are respectively converted into corresponding Yin codes using a Pin Yin/Yin code conversion table and a Zhu Yin/Yin code conversion table. A dictionary stores a Chinese character code (corresponding to a word) in correspondence with an Yin code sequence. An input Yin code sequence is created from the input data. An Yin code in the input Yin code sequence and an Yin code in the Yin code sequence in the dictionary are compared with each other through a filter for masking a predetermined bit of the Yin code. A Chinese character code corresponding to Yin code sequences which coincide with each other by the comparison is read out from the dictionary, and a word (a Chinese character) corresponding to the Chinese character code is displayed.

20 Claims, 15 Drawing Sheets

Fig. 3

Pin Yin/Yin CODE CONVERSION TABLE

| Pin Yin | Yin CODE | |
|---|---|---|
| | HEXA-DECIMAL NOTATION | BINARY NOTATION |
| Zhong | 52f8 | 0101 0010 1111 1000 |
| Zhōng | 53f8 | 0101 0011 1111 1000 |
| Zhóng | 53f9 | 0101 0011 1111 1001 |
| Zhǒng | 53fa | 0101 0011 1111 1010 |
| Zhòng | 53fb | 0101 0011 1111 1011 |
| ... | ... | ... ... |
| Guo | 66b4 | 0110 0110 1011 0100 |
| Guō | 67b4 | 0110 0111 1011 0100 |
| Guó | 67b5 | 0110 0111 1011 0101 |
| Guǒ | 67b6 | 0110 0111 1011 0110 |
| Guò | 67b7 | 0110 0111 1011 0111 |
| ... | ... | ... ... |
| Rì | 37db | 0011 0111 1101 1011 |
| ... | ... | ... ... |
| Rěn | 31a2 | 0011 0001 1010 0010 |
| ... | ... | ... ... |

Fig. 4

Zhu Yin/Yin CODE CONVERSION TABLE

| Zhu Yin | Yin CODE | |
|---|---|---|
| | HEXA-DECIMAL NOTATION | BINARY NOTATION |
| ㄓㄨㄥ | 52f8 | 0101 0010 1111 1000 |
| ㄓㄨㄥ˗ | 53f8 | 0101 0011 1111 1000 |
| ㄓㄨㄥˊ | 53f9 | 0101 0011 1111 1001 |
| ㄓㄨㄥˇ | 53fa | 0101 0011 1111 1010 |
| ㄓㄨㄥˋ | 53fb | 0101 0011 1111 1011 |
| ... | ... | .. .. |
| ㄍㄨㄛ | 66b4 | 0110 0110 1011 0100 |
| ㄍㄨㄛ˗ | 67b4 | 0110 0111 1011 0100 |
| ㄍㄨㄛˊ | 67b5 | 0110 0111 1011 0101 |
| ㄍㄨㄛˇ | 67b6 | 0110 0111 1011 0110 |
| ㄍㄨㄛˋ | 67b7 | 0110 0111 1011 0111 |
| ... | ... | .. .. |
| ㄖˋ | 37db | 0011 0111 1101 1011 |
| ... | ... | .. .. |
| ㄙˇ | 31a2 | 0011 0001 1010 0010 |
| ... | ... | .. .. |

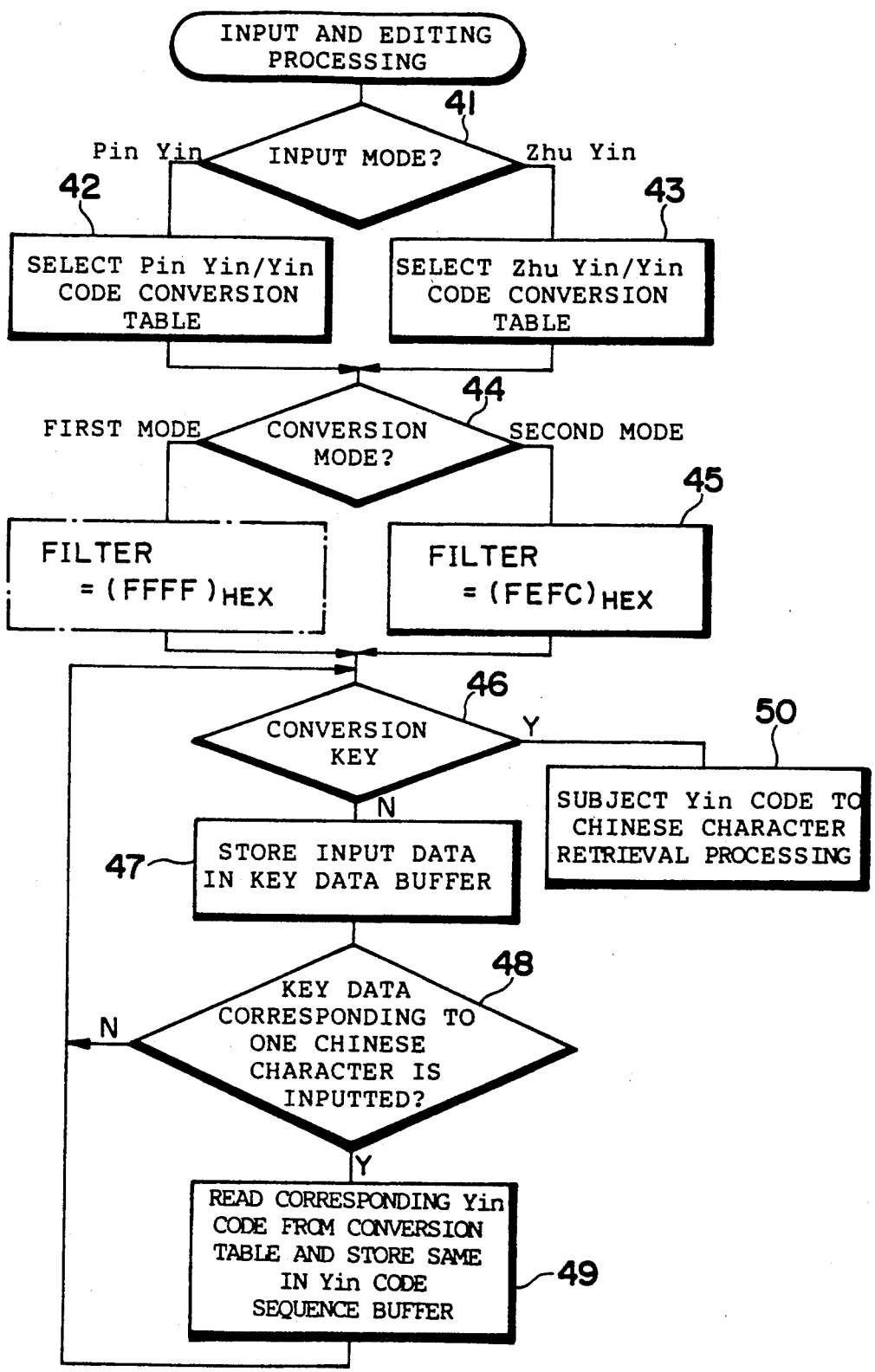

Fig.13

Yin CODE SEQUENCE/CHINESE
CHARACTER CODE CORRESPONDENCE TABLE

| RELATIVE ADDRESS | Yin CODE SEQUENCE | CHINESE CHARACTER CODE |
|---|---|---|
| . . . | . . . | . . . |
| 100 | 53f8  67b5  31d9  φ | 中国人 |
| 101 | 53f8  67b5  φ | 中国 |
| 102 | 53f8  φ | 中 |
| 103 | 53f8  φ | 忠 |
| . . . | . . . | . . . |
| 205 | 37db  31a2  φ | 日本 |
| . . . | . . . | . . . |
| $\ell$ | YO($\ell$,1)  YO($\ell$,2)  φ | KA($\ell$) |

YO($\ell$,C)
C = 1

Fig.14

CHINESE CHARACTER
CODE BUFFER
RT(find)

| RELATIVE ADDRESS | |
|---|---|
| 1 | RT(1) |
| 2 | RT(2) |
| . . . | . . . |

Fig. 15

| Pin Yin | Yin CODE (HEXA-DECIMAL NOTATION) | Yin CODE (BINARY NOTATION) |
|---|---|---|
| Zhōng | 53f8 | 0101 0011 1111 1000 |
| Zhóng | 53f9 | 0101 0011 1111 1001 |
| Zhǒng | 53fa | 0101 0011 1111 1010 |
| Zhòng | 53fb | 0101 0011 1111 1011 |
| FILTER | FEFC | 1111 1110 1111 1100 |
| Zhong | 52f8 | 0101 0010 1111 1000 |

Fig. 16

```
INPUT INCLUDING
   Sheng Diao
```

Zhong 1 Guo 2

(Zhōng Guó)

⇓

CONVERSION
TO Yin CODE

⇓

53f8    67b5

⇓

FILTER  FEFC

⇓

52f8    66b4     ⇔    52f8    66b4

⇑                              ⇑

FILTER  FEFC           FILTER  FEFC

⇑                              ⇑

52f8    66b4

⇑

CONVERSION
TO Yin CODE

⇑

Zhong  Guo

```
INPUT INCLUDING
  NO Sheng Diao
```

Yin CODE SEQUENCE/CHINESE
CHARACTER CODE
CORRESPONDENCE TABLE

| Yin CODE SEQUENCE | CHINESE CHARACTER CODE |
|---|---|
| 53f8  67b5 | 中国 |

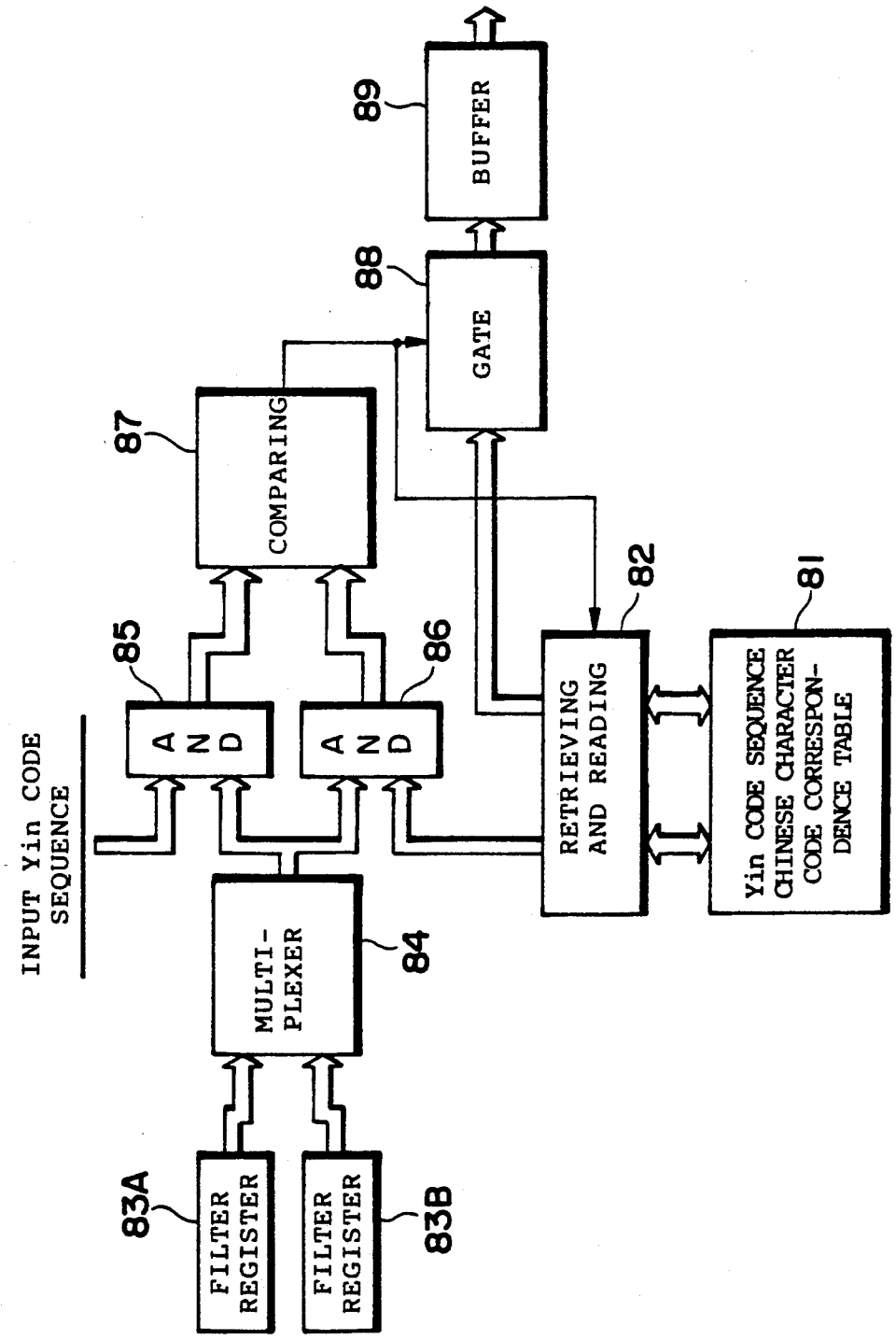

APPARATUS AND METHOD FOR SELECTIVELY CONVERTING A PHONETIC TRANSCRIPTION OF CHINESE INTO A CHINESE CHARACTER FROM A PLURALITY OF NOTATIONS

BACKGROUND OF THE INVENTION

1. Field of the Invention

The present invention relates generally to an apparatus for and a method of converting a representation of a pronunciation by means of phonetic symbols (hereinafter referred to as a phonetic transcription) of Chinese inputted from a keyboard or the like into a corresponding Chinese character to output the same, and more particularly, to an apparatus and a method suitably utilized in a word processor, a work station and the like for Chinese.

2. Description of the Related Art

Chinese is represented by Chinese characters. There are several types of notation for indicating a pronunciation of a Chinese character. Typical examples include Pin Yin notation issued in 1958 by the People's Republic of China Government and Zhu Yin notation used before 1958 and used in Taiwan even at the present time.

A pronunciation of one Chinese character can be analyzed into Sheng Mu corresponding to a consonant, Yun Mu corresponding to a vowel, and Si Sheng or Sheng Diao representing tones or intonations. Yun Mu and Sheng Mu are together referred to as Sheng Yun. Some Chinese characters have toneless pronunciations. A pronunciation of one Chinese character is indicated by not more than one (one or zero) Sheng Mu and one Yun Mu (and further Sheng Diao, as required).

Sheng Diao is classified into the following four types:

Yi Sheng or 1 Sheng: it is a high tone and is flat, which is indicated by "-".

Er Sheng or 2 Sheng: it is raised from a low tone to a high tone, which is indicated by "/".

Shan Sheng or 3 Sheng: it is lowered from a high tone to a low tone and then, is raised to a high tone, which is indicated by "ᴗ".

Si Sheng or 4 Sheng: it is lowered from a high tone to a low tone, which is indicated by "\".

For example, a Chinese character "中国(which means China)" is represented as "Zhōng Guó" in the Pin Yin notation, where "Zh" and "G" are Sheng Mu, and "ong" and "uo" are Yun Mu. In addition, a Chinese character "日本(which means Japan)" is represented as "RiiBen" in the Pin Yin notation, where "R" and "B" are Sheng Mu, and "i" and "en" are Yun Mu.

In the conventional word processor for Chinese, only input according to the Pin Yin notation has been allowed. The Pin Yin notation is relatively new. Accordingly, some people or generations know the Zhu Yin notation but do not know the Pin Yin notation. Consequently, an attempt to allow more people to make use of the word processor for Chinese brings about the necessity of allowing input according to the Zhu Yin notation.

Furthermore, the Pin Yin notation is provided using Pekingese as a standard language. In vast China, some languages have pronunciations different from that of Pekingese in Sheng Diao. Even Sheng Yun may, in some cases, be different from that of Pekingese from region to region. Consequently, it is difficult for people who do not know Pekingese used as a standard language or do not have a good knowledge thereof to correctly input Sheng Yun and Sheng Diao, so that an input error frequently occurs. People within the sphere of Pekingese do not necessarily pronounce Chinese while being conscious in Sheng Diao, so that they must perform input work to the word processor while remembering or thinking of Sheng Diao, thereby not only to make the input work complicated but also to make it impossible to input correct Sheng Diao in some cases.

In the conventional word processor for Chinese, only when Sheng Yun and Sheng Diao are correctly inputted a correct Chinese character corresponding thereto is outputted. Accordingly, if there is an input error, a correct Chinese character is not obtained.

SUMMARY OF THE INVENTION

An object of the present invention is to make it possible to input a pronunciation using any one of a plurality of types of notation including Pin Yin notation and Zhu Yin notation in an apparatus for converting phonetic transcriptions of Chinese into Chinese characters.

Another object of the present invention is to make it possible to obtain candidate Chinese characters including a desired Chinese character even if Sheng Diao is not inputted or Sheng Diao is erroneously inputted.

Still another object of the present invention is to make it possible to obtain, if at least a part of a pronunciation is correct, candidate Chinese characters corresponding to a pronunciation including the part of the pronunciation.

In accordance with a first aspect, an apparatus for converting phonetic transcriptions of Chinese into Chinese characters according to the present invention is characterized by comprising an input device capable of inputting a pronunciation of Chinese according to a plurality of types of notation, a plurality of conversion tables respectively provided with respect to the plurality of types of notation which can be inputted using the input device and for converting input data according to each of the types of notation into an Yin code (which means a sound code) corresponding to a pronunciation indicated by the input data, a dictionary storing an Yin code and a Chinese character code representing a Chinese character having a pronunciation indicated by the Yin code in correspondence with each other, and control means for converting the input data inputted from the input device into an Yin code using any one of the plurality of conversion tables and retrieving in the dictionary a Chinese character code corresponding to the Yin code obtained by the conversion.

In a preferred embodiment, the apparatus according to the present invention is further provided with input mode selecting means for selecting any one of the plurality of types of notation. Input data is converted into an Yin code using a conversion table related to the notation selected by the input mode selecting means.

The notation may be automatically judged on the basis of input data inputted from the input device. A conversion table to be used may be selected in accordance with this judgment.

The input device may be constituted by a device for converting an input voice into a voice electric signal and a speech recognition device for recognizing a pronunciation on the basis of the voice electric signal and converting the input voice into an Yin code.

When the apparatus according to the present invention is applied to a word processor for Chinese, there are further provided means for converting a Chinese character code retrieved into display data representing a Chinese character represented by the Chinese character code and a device for displaying the Chinese character on the basis of the display data.

The apparatus is further provided with designating means for designating any one of candidate Chinese characters displayed and a memory for storing a Chinese character code representing the designated Chinese character.

In order to apply the apparatus to a more actual word processor, each of the conversion tables is so constructed as to convert input data into an Yin code with respect to one Chinese character. On the other hand, the dictionary is so constructed as to store an Yin code sequence and a Chinese character code in correspondence with each other with respect to a word comprising one Chinese character or a plurality of Chinese characters. A series of input data inputted from the input device is partitioned for each Chinese character and converted into Yin codes. One or a plurality of Yin codes after the conversion are arranged for each word to create an Yin code sequence. A Chinese character code corresponding to the Yin code sequence is retrieved in the dictionary.

The present invention is based on a recognition that one yin code can correspond to one pronunciation (the reading of a Chinese character). Even if a plurality of types of notation such as Pin Yin notation and Zhu Yin notation exist, pronunciations indicated in the types of notation can be always caused to converge in one Yin code if they are the same. Consequently, a dictionary searched using an Yin code is sufficient for a dictionary of Chinese characters (or words) to be prepared. In such a manner, according to the present invention, a pronunciation can be inputted using any one of the plurality of types of notation, and the inputted pronunciation is converted into a Chinese character having the pronunciation.

In an embodiment of the present invention, even if Sheng Diao is not correctly inputted or a phonetic transcription is slightly erroneous, it is possible to obtain candidate Chinese characters including a desired Chinese character. Therefore, the apparatus according to the present invention further comprises filtering means for masking a predetermined one or a plurality of bits composing an Yin code. The control means filters an Yin code corresponding to input data and an Yin code in the dictionary using the above-mentioned filtering means and then, compares the Yin codes with each other, thereby to search the dictionary for an Yin code which coincides with the Yin code corresponding to the input data.

The features of the present embodiment will be sufficiently made clear from a second aspect of the present invention as described below.

In accordance with a second aspect, an apparatus for converting phonetic transcriptions of Chinese into Chinese characters is characterized by comprising converting means for converting inputted data indicating a pronunciation of Chinese into an Yin code corresponding to the pronunciation, a dictionary storing an Yin code and a Chinese character code representing a Chinese character having a pronunciation indicated by the Yin code in accordance with each other, filtering means for masking a predetermined one or a plurality of bits composing an Yin code, and control means for filtering the Yin code obtained from the converting means and the Yin code in the dictionary using the filtering means and then, comparing the Yin codes with each other, thereby to retrieve in the dictionary an Yin code which coincides with the Yin code obtained from the converting means and read out from the dictionary a Chinese character code corresponding to the Yin code which coincides with the Yin code obtained from the converting means.

The Yin code is so constructed, in one embodiment, as to include bits representing Sheng Mu, bits representing Yun Mu, and bits representing Sheng Diao. In this case, the filtering means is so constructed as to mask the bit representing Sheng Mu, the bit representing Yun Mu, or the bit representing Sheng Diao.

It should be understood that the filtering means comprises one which allows the Yin code to directly pass.

There is further provided retrieval mode selecting means for selecting the presence or absence of the use of the filtering means or any one of the plurality of filtering means, as required.

As in the first aspect of the present invention, there may be further provided an input device capable of inputting a pronunciation of Chinese according to a plurality of types of notation. In this case, the converting means comprises a plurality of conversion tables respectively provided with respect to the plurality of types of notation which can be inputted using the input device and for Converting input data according to each of the types of notation into an Yin code corresponding to a pronunciation indicated by the input data.

The input means and the converting means may be replaced with speech recognizing means for recognizing a pronunciation on the basis of a voice input signal and outputting an Yin code corresponding to the pronunciation.

In order to achieve a more actual word processor, there will be provided means for converting a Chinese character code read out into display data representing a Chinese character represented by the Chinese character code, a device for displaying the Chinese character on the basis of the display data, designating means for designating any one of candidate Chinese characters displayed, and a memory for storing a Chinese character code representing the designated Chinese character.

Furthermore, the converting means is constructed as one for converting input data into an Yin code with respect to one Chinese Character, while the dictionary is constructed as one for storing an Yin code sequence and a Chinese character code in correspondence with each other with respect to a word comprising one Chinese character or a plurality of Chinese characters. A series of input data is partitioned for each Chinese character and converted into Yin codes, and one or a plurality of Yin codes after the conversion are arranged for each word to form an Yin code sequence. A Chinese character code corresponding to the Yin code sequence is retrieved in the dictionary.

According to the present invention, an Yin code representing input data and an Yin code in the dictionary are filtered and then, are compared with each other. Since parts of the Yin codes whose coincidence or non-coincidence should be ignored (one or a plurality of bits) are masked by a filter, so that comparison processing does not cover the masked portions.

In a case where it is desired to ignore Sheng Diao, therefore, a filter suitable for the case is used, thereby to obtain one or a plurality of candidate Chinese characters corresponding to an Yin code which coincides with an Yin code corresponding to input data in the other part (Sheng Yun) irrespective of the coincidence or non-coincidence in Sheng Diao or without inputting Sheng Diao. In such a manner, even if Sheng Diao is not inputted or Sheng Diao is erroneously inputted, candidate Chinese characters (words) including a desired Chinese character (word) are outputted.

The type of filter can be arbitrarily set. Consequently, it is possible to retrieve Chinese characters under the condition that they coincide with each other in only Sheng Mu or only Yun Mu. That is, even if at least a part of a pronunciation is correct, it is possible to obtain candidate Chinese characters (words) corresponding to a pronunciation including the pronunciation.

The present invention further provides methods of converting phonetic transcriptions of Chinese into Chinese characters respectively corresponding to the above-mentioned apparatuses constructed in accordance with the first and second aspects.

In accordance with the first aspect, the method according to the present invention is characterized by comprising the steps of allowing a pronunciation of Chinese to be inputted according to a plurality of types of notation, previously preparing a plurality of conversion tables respectively provided with respect to the plurality of types of notation which can be inputted and for converting input data according to each of the types of notation into an Yin code corresponding to a pronunciation indicated by the input data and a dictionary storing an Yin code and and a Chinese character code representing a Chinese character having a pronunciation indicated by the Yin code in correspondence with each other, and converting the input data into an Yin code using any one of the plurality of conversion tables, and retrieving in the dictionary a Chinese character code corresponding to the Yin code obtained by the conversion.

In accordance with the second aspect, the method according to the present invention is characterized by comprising the steps of previously preparing a dictionary storing an Yin code and a Chinese character code representing a Chinese character having a pronunciation indicated by the Yin code in correspondence with each other, converting data representing a pronunciation of Chinese inputted into an Yin code corresponding to the pronunciation, and filtering the Yin code obtained by the conversion and the Yin code in the dictionary by masking a predetermined one or a plurality of bits composing the Yin code and then, comparing the Yin codes with each other, retrieving in the dictionary an Yin code which coincides with the Yin code obtained by the conversion, and reading out from the dictionary a Chinese character code corresponding to the Yin code which coincides with the Yin code obtained by the conversion.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 illustrates one example of a Pin Yin/Yin code conversion table;

FIG. 4 illustrates one example of a Zhu Yin/Yin code conversion table;

FIG. 6 is a flow chart showing the procedure for input and editing processing;

FIG. 13 illustrates one example of an Yin code sequence/Chinese character code correspondence table;

FIG. 14 illustrates a Chinese character code buffer;

FIG. 15 shows how an Yin code is converted by filtering; FIG. 16 shows how a Chinese character is retrieved utilizing a filter; and FIG. 17 is a block diagram illustrating the hardware architecture of a Chinese character retrieval processor or illustrating a Chinese character retrieval processor by paying attention to the function thereof.

DESCRIPTION OF THE PREFERRED EMBODIMENTS

Figure 1:
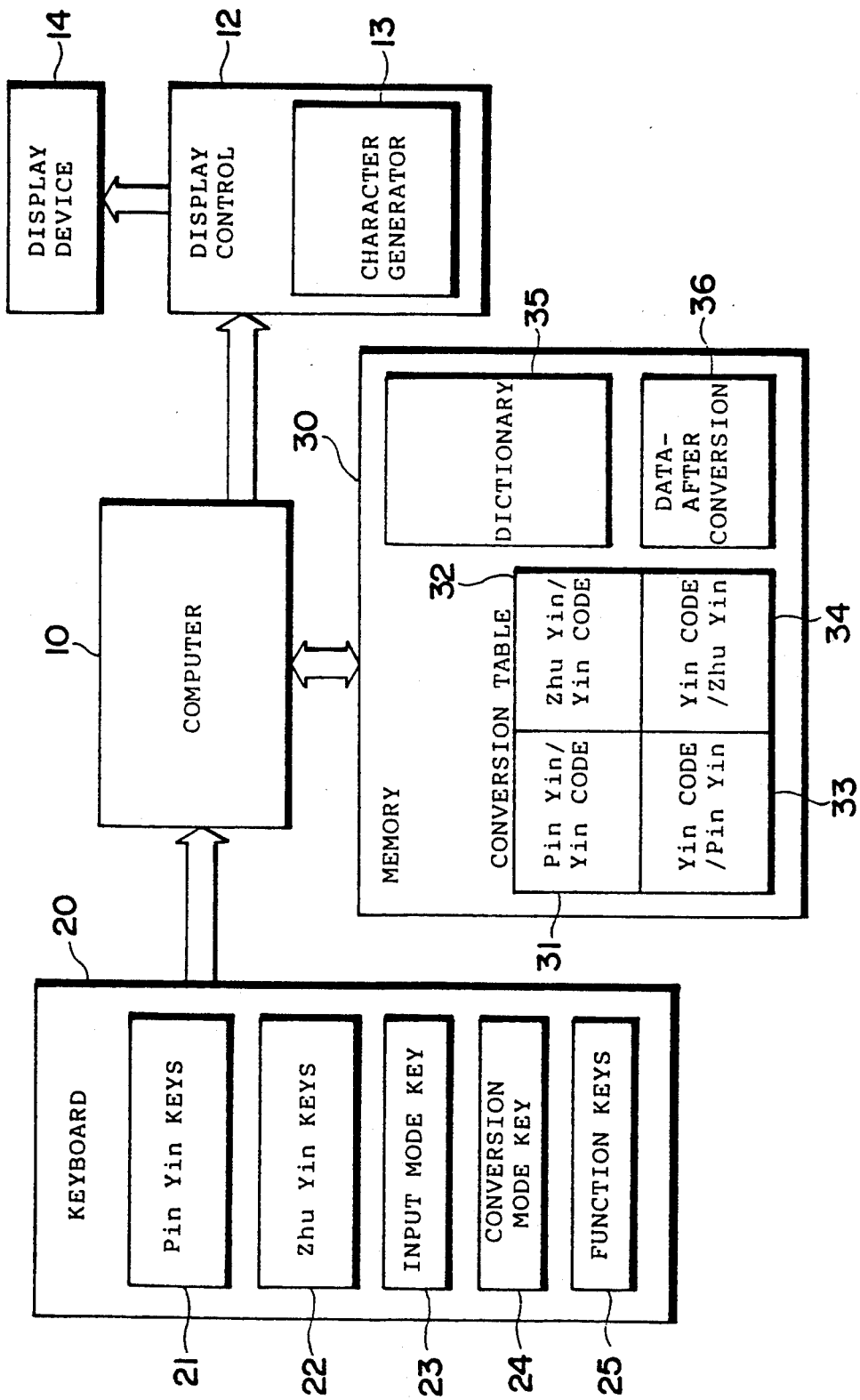
FIG. 1 is a block diagram illustrating the electrical construction of an apparatus for converting phonetic transcriptions of Chinese into Chinese characters.

FIG. 1 illustrates the construction of an apparatus for converting phonetic transcriptions of Chinese into Chinese characters. This apparatus will be generally realized as a part of a word processor, a work station and the like for Chinese.

The apparatus for converting phonetic transcriptions of Chinese into Chinese characters comprises a computer 10 including a central processing unit (CPU), a keyboard 20 for inputting phonetic transcriptions, various modes and other functions, a memory device 30 storing a dictionary and various conversion tables, a display device 14 for displaying Chinese characters obtained by the conversion and other information or data, and a control device 12 for controlling the display device 14.

A commercially available general-purpose computer can be used as the computer 10. This computer 10 is so programmed as to execute input and editing processing and Chinese character retrieval processing as described later.

In the present embodiment, examples of phonetic notation which can be used include Pin Yin notation and Zhu Yin notation. In addition, a complete phonetic transcription including Sheng Diao (represented by Sheng Yun and Sheng Diao) and a phonetic transcription excluding Sheng Diao (represented by only Sheng Yun) are allowed.

A key board 20 comprises Pin Yin keys 21 for inputting a pronunciation using the Pin Yin notation, Zhu Yin keys 22 for inputting a pronunciation using the Zhu Yin notation, an input mode key 23 for selecting the Pin Yin notation or the Zhu Yin notation to be used for inputting a pronunciation, a conversion mode key 24 for selecting the complete phonetic transcription including Sheng Diao (which is referred to as a first mode) and the pronunciation excluding Sheng Diao (which is referred to as a second mode) to be used when it is desired to retrieve a Chinese character, and function keys including a conversion key for commanding that the inputted phonetic transcription should be converted into a Chinese character, a space key (if required) and other function keys for inputting the other functions.

Data (or a code) representing a phonetic transcription in Pin Yin notation or Zhu Yin notation inputted from the key board 20 is converted into a corresponding Yin code which will be explained later. A Pin Yin/Yin code conversion table 31 and a Zhu Yin/Yin code conversion table 32 are provided for the memory device 30 so as to perform the code conversion. In order to display the inputted phonetic transcription in Pin Yin notation or the other notation, the memory device 30 is provided with an Yin code/Pin Yin conversion table 33 and an Yin code/Zhu Yin conversion table 34 for performing reverse conversion from an Yin code obtained by the conversion into data (or a code) representing a phonetic transcription in Pin Yin notation or Zhu Yin notation. In addition, the memory device 30 is provided with a dictionary 35 used for retrieving, on the basis of the Yin code obtained by the conversion, a code representing a Chinese character (a Chinese character code) corresponding thereto and a data-after-conversion area 36 for storing the Chinese character code obtained by the retrieval. The memory device 30 is realized by a semiconductor memory (a ROM or a RAM), a magnetic memory (a floppy disk or a hard disk) or their combination. For example, the conversion tables 31 to 34 are stored in the ROM, the floppy disk or the hard disk, the dictionary 35 is stored in the floppy disk or the hard disk, and the data-after-conversion area 36 is provided in the RAM.

As the display device 14, a CRT display device is most commonly used. However, a plasma display device and a liquid crystal display device can be also utilized. The display control device 12 contains a character generator 13. The character generator 13 is for converting the data representing a phonetic transcription in Pin Yin notation or Zhu Yin notation and the Chinese character code into display data (dot data).

Figure 2:
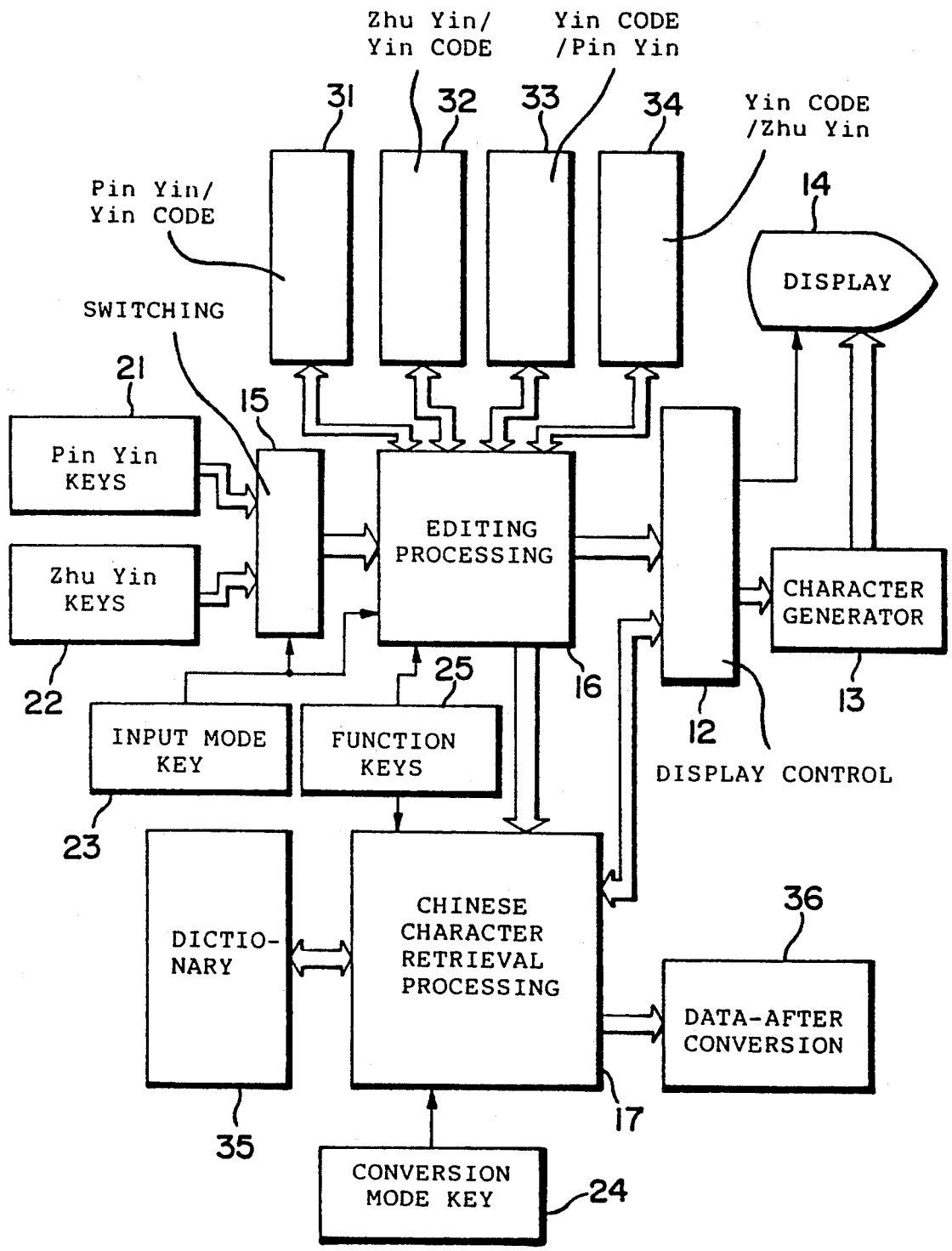
FIG. 2 is a block diagram illustrating the hardware architecture of main parts of the apparatus shown in FIG. 1 or the construction of the apparatus as viewed from the functional point of view

FIG. 2 is a diagram showing the main parts of the apparatus shown in FIG. 1 arranged in accordance with the function and the flow of processing. A switching circuit 15, an editing processor 16, and a Chinese character retrieval processor 17 are substantially realized by the computer 10. Alternatively, the apparatus for converting phonetic transcriptions of Chinese into Chinese characters may be so constructed as to have hardware architecture shown in FIG. 2.

The switching circuit 15 selects the Pin Yin keys 2 or the Zhu Yin keys 22 in accordance with a selection input through the input mode key 23. Data representing a phonetic transcription in Pin Yin notation or Zhu Yin notation inputted using the Pin Yin keys 21 or the Zhu Yin keys 22 is applied to the editing processor 16. The switching circuit 15 may automatically discriminate between input by the Pin Yin keys and input by the Zhu Yin keys and select the input.

Chinese words include one constituted by one Chinese character and one constituted by a plurality of Chinese characters (generally, two or three Chinese characters). The editing processor 16 divides a data sequence representing the inputted phonetic transcription in Pin Yin notation Or Zhu Yin notation into each data representing one Chinese character, and converts each of data obtained by the partition into an Yin code by referring to the conversion table 31 or 32 selected by the input mode key 23. If input is provided from the conversion key included in the function keys 25, an Yin code sequence created from data so far inputted is applied to the Chinese character retrieval processor 17 from the editing processor 16. The editing processor 16 applies the data representing the inputted phonetic transcription in Pin Yin notation or Zhu Yin notation to the display control device 12. Accordingly, inputted characters in the Pin Yin notation or the Zhu Yin notation are sequentially displayed in the order of input on the display screen of the display device 14. In this case, the reverse conversion tables 33 and 34 are not required. When the editing processor 16 converts the input data into an Yin code and then, the Yin code is displayed according to the Pin Yin notation or the Zhu Yin notation, the reverse conversion tables 33 and 34 are used. The reverse conversion tables 33 and 34 are effectively used particularly when data inputted according to the Pin Yin notation (Or the Zhu Yin notation) is displayed according to the Zhu Yin notation (or the Pin Yin notation). This is convenient because an operator who knows only the Pin Yin notation can know the Zhu Yin notation, and an operator who know only the Zhu Yin notation can know the Pin Yin notation.

The Chinese character retrieval processor 17 searches the dictionary 35 on the basis of the applied Yin code sequence in accordance with the selection given by the conversion mode key 24, reads out a Chinese character code or codes representing one or a plurality of Chinese characters having a pronunciation indicated by the Yin code sequence, and applies the Same to the display control device 12. The display control device 12 reads out from the character generator 13 display data for displaying the Chinese character or characters represented by the applied Chinese character code or codes and displays one or a plurality of Chinese characters (candidate Chinese characters) on the display screen of the display device 14 on the basis of the display data. When an operator watches this display screen and confirms the displayed Chinese character or characters or selects any one of the Chinese characters using the function key 25, a Chinese character code or codes representing the Chinese character or characters confirmed or selected is stored in the data-after-conversion area 36.

FIG. 3 and FIG. 4 respectively show one example of a Pin Yin/Yin code conversion table and one example of a Zhu Yin/Yin code conversion table.

Various types of notation such as Pin Yin notation and Zhu Yin notation have been known. A phonetic transcription in each of these notations always corresponds to a pronunciation. An Yin code is assigned to a pronunciation (An Yin means a sound). A phonetic transcription in the Pin Yin notation always corresponds to an Yin code, and a phonetic transcription in the Zhu Yin notation always corresponds to an Yin code. A phonetic transcription in the Pin Yin notation indicating a pronunciation and a phonetic transcription in the Zhu Yin notation indicating the same pronunciation correspond to a common Yin code. In such a manner, even if there are a plurality of types of notation used for inputting a pronunciation, the same pronunciation is represented using one Yin code. Whether a pronunciation is inputted using the Pin Yin notation or a pronunciation is inputted using the Zhu Yin notation, the pronunciations are converted into one Yin code if they are the same. Accordingly, An Yin code can be uniformly used as a code indicating only one pronunciation within the apparatus. Therefore, a dictionary need not be prepared for each notation. That is, a dictionary for the Pin Yin notation and a dictionary for the Zhu Yin notation need not be prepared. A dictionary searched using an Yin code common to all types of notation is sufficient.

Figures 5A, 5B:
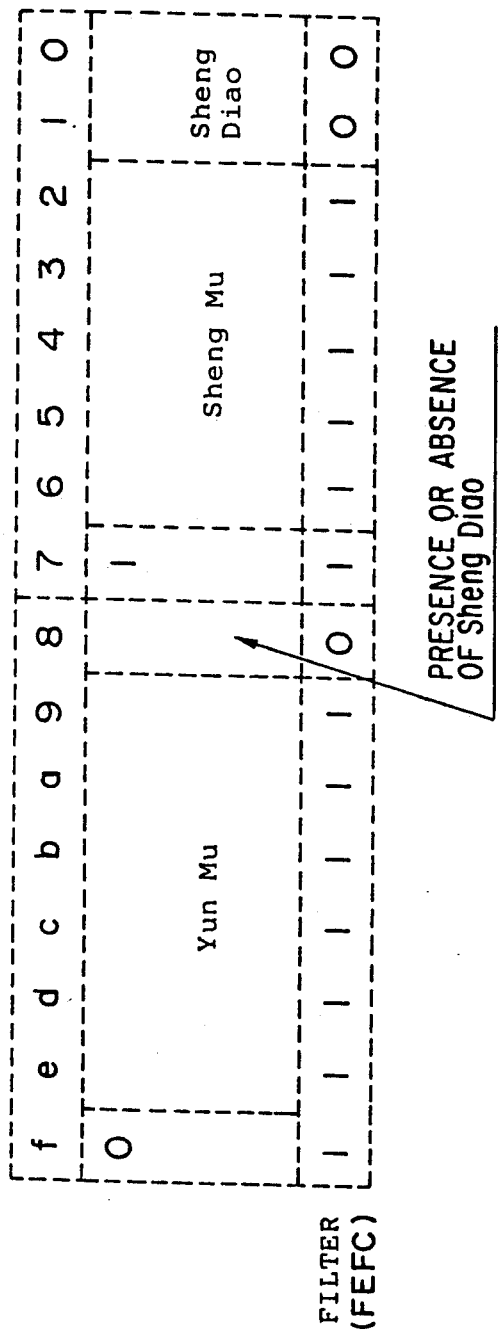
FIG. 5a illustrates a data format Of an Yin code.
FIG. 5b illustrates a code representing Sheng Diao.

For example, a pronunciation represented by a phonetic transcription in the Pin Yin notation shown on the first line in FIG. 3 and a pronunciation represented by a phonetic transcription in the Zhu Yin notation shown on the first line in FIG. 4 are the same. Accordingly, the phonetic transcriptions correspond to the same Yin code 52f8 (in hexadecimal notation). The same is true for phonetic transcriptions on the other lines. Although in FIGS. 3 and 4, the leftmost column shows phonetic transcriptions in the Pin Yin notation and the Zhu Yin notation, respectively, for easy understanding, it goes without saying that phonetic transcriptions are represented in binary notation within the conversion tables FIG. 5a illustrates a data format of an Yin code. In this embodiment, the Yin code is composed of two bytes. The upper one byte mainly represents Yun Mu, and the lower one byte mainly represents Sheng Mu. Data "0" represented by the most significant bit (f) of the upper one byte and data "1" represented by the most significant bit (7) of the lower one byte are used for discriminating between the upper one byte and the lower one byte composing one Yin code as well as discriminating the Yin code from another data (particularly, another Yin code in an Yin code sequence).

The least significant bit (the eighth bit) of the upper one byte represents the presence or absence of Sheng Diao. The reason for this is that some pronunciations have no Sheng Diao. The absence of Sheng Diao is represented by "0", and the presence of Sheng Diao is represented by "1". The lower two bits (the 0-th bit to the first bit) of the lower one byte represent Sheng Diao. As shown in FIG. 5b, Yi Sheng, Er Sheng, Shan Sheng, and Si Sheng are respectively represented by "00", "01", "10", and "11".

Intermediate six bits (the ninth bit to the e-th bit) of the upper one byte represent Yun Mu, and intermediate five bits (the second bit to the sixth bit) represent Sheng Mu. Since there are 37 types of Yun Mu and there are 24 types of Sheng Mu, this number of bits is sufficient.

A filter is used in Chinese character retrieval processing as described later. This filter is composed of two bytes. The 0-th bit, the first bit and the eighth bit are set to "0" and the other bits are set to "1". This filter is represented as "FEFC" in hexadecimal notation.

Figure 7:
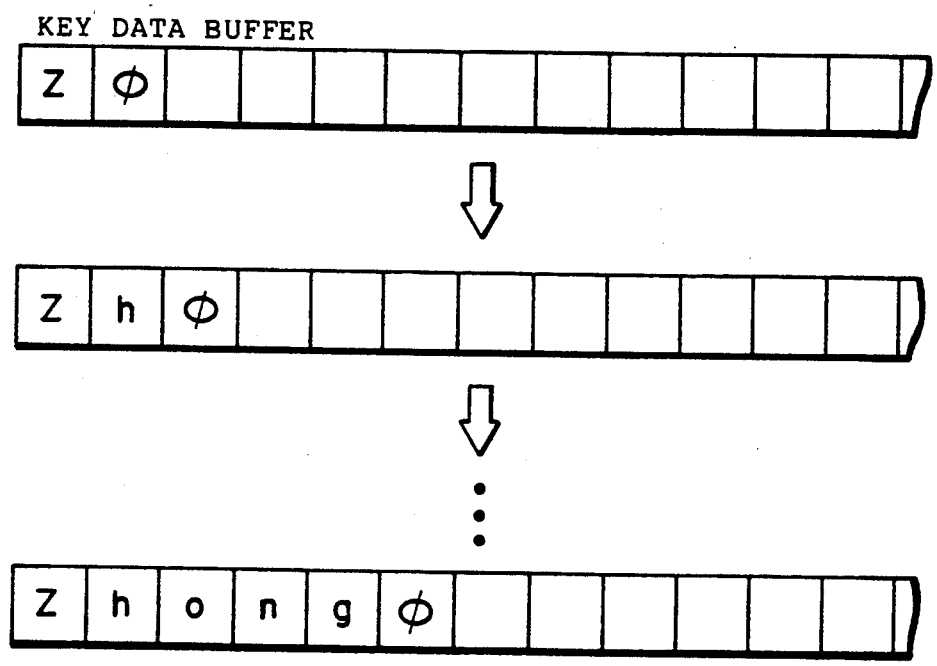
FIG. 7 shows how key input data is stored in a kay data buffer.
Figure 8:
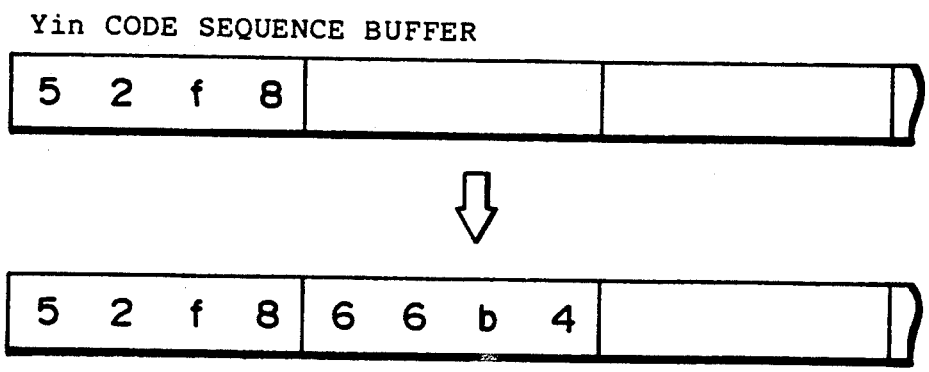
FIG. 8 shows how an Yin code is stored in an Yin code sequence buffer.

FIG. 6 shows the procedure for input and editing processing executed by the computer 10 or an operation of the editing processor 16. The computer 10 or the editing processor 16 is provided with a key data buffer as shown in FIG. 7 and an Yin code sequence buffer as shown in FIG. 8.

First, it is judged which of the Pin Yin notation and the Zhu Yin notation is set as an input mode by the input mode key 23 (step 41). The Pin Yin/Yin code conversion table 31 is selected if the Pin Yin notation is selected (step 42), while the Zhu Yin/Yin code conversion table 32 is selected if the Zhu Yin notation is selected (step 43).

Subsequently, it is judged which of the first mode and the second mode is selected by the conversion mode key 24 (step 44). No processing is required when the first mode is selected. Data or codes "FEFC" is set in a filter (which is realized by a register or a memory area) when the second mode is selected (step 45). When the first mode is selected, "FFFF" in which all bits are "1" may be set in the filter.

Every time character or symbol data representing a phonetic transcription is inputted from the Pin Yin keys 21 or the Zhu Yin keys 22, the data is stored in the key data buffer (step 47). As shown in FIG. 7, when one character is inputted, data representing a terminal symbol "φ" is stored in the succeeding stage of the character. The reason for this is that data representing a phonetic transcription is variable-length data, and the terminal of the data must be clearly shown. FIG. 7 shows how a phonetic transcription in Pin Yin notation "Zhong" is inputted in the second mode.

It is judged whether or not key data corresponding to one Chinese character bas been inputted (step 48). Examples of this judgment include various methods. The first method is one of causing an operator to depress the space key when input of key data corresponding to one Chinese character is terminated. If input is provided by the space key, it is judged that input of key data corresponding to one Chinese character is terminated. The second method is one, which is effective in the first mode, of causing an operator to input figures 1, 2, 3 and 4 for representing Sheng Diao after inputting a phonetic transcription. For example, the operator inputs "Zhong1" with respect to one pronounced as "Zhong" and having Yi Sheng. If key input of a figure is provided, it is judged that input of key data corresponding to one Chinese character is terminated. The third method is one of making judgment by automatic recognition by division of syllables. A phonetic transcription in the Pin Yin notation has a predetermined rule. Accordingly, if this rule is utilized, it can be judged whether in a key data sequence inputted input of key data corresponding to one Chinese character is terminated. Similarly, a phonetic transcription in the Zhu Yin notation has a predetermined rule, so that the rule can be utilized.

In any case, when key data corresponding to one Chinese character has been inputted, the inputted key data (in the Pin Yin notation or the Zhu Yin notation) is converted into a corresponding Yin code by referring to the Pin Yin/Yin code conversion table 31 or the Zhu Yin/Yin code conversion table 32 previously selected. This Yin code is stored in the Yin code sequence buffer (step 49).

The above-mentioned processing in the step 47 is repeatedly performed until input of the key data corresponding to one Chinese character is terminated (step 48). The processing in the steps 47 to 49 is repeatedly performed until the conversion key is depressed (step 46). If input of the conversion key is provided, the Yin code sequence stored in the Yin code sequence buffer is subjected to Chinese character retrieval processing shown in FIG. 9 to 11 (step 50).

For example, when "Zhong Guo" is inputted according to the Pin Yin notation in the second mode, key input data "Zhong" and "Guo" are respectively converted into Yin codes "52f8" and "66b4", to obtain an Yin code sequence "52f866b4".

A phonetic transcription including Sheng Diao may be inputted after the second mode is designated. For example, it is possible to input "Zhong1 Guo2". In this case, an Yin code sequence "53f867b5" is created. Since the second mode is designated the filter is set to "FEFC" (step 45), and retrieval processing in the second mode as described in detail later is performed.

Figure 9:
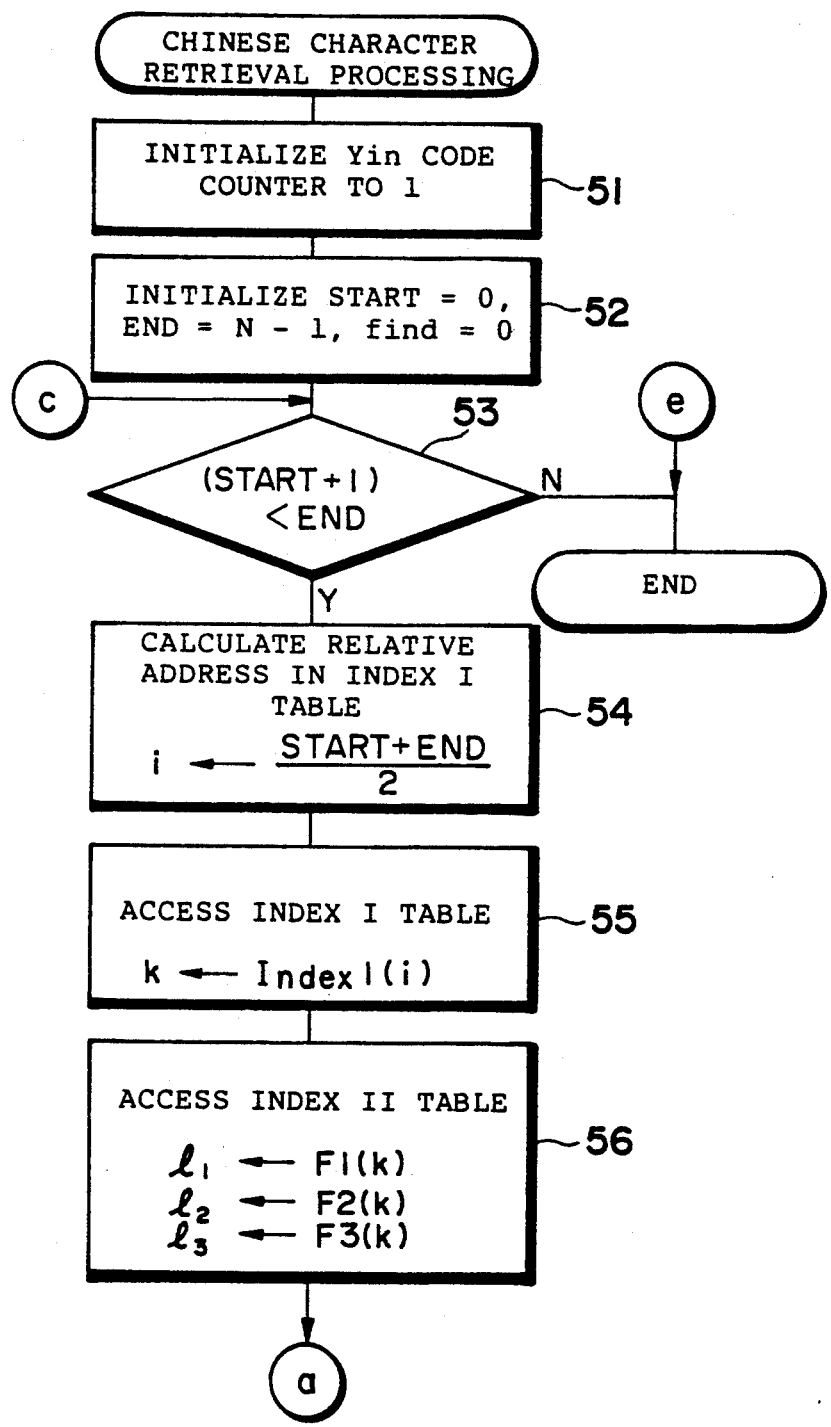
FIGS. 9 to 11 are flow charts showing the procedure for Chinese character retrieval processing.
Figure 10:
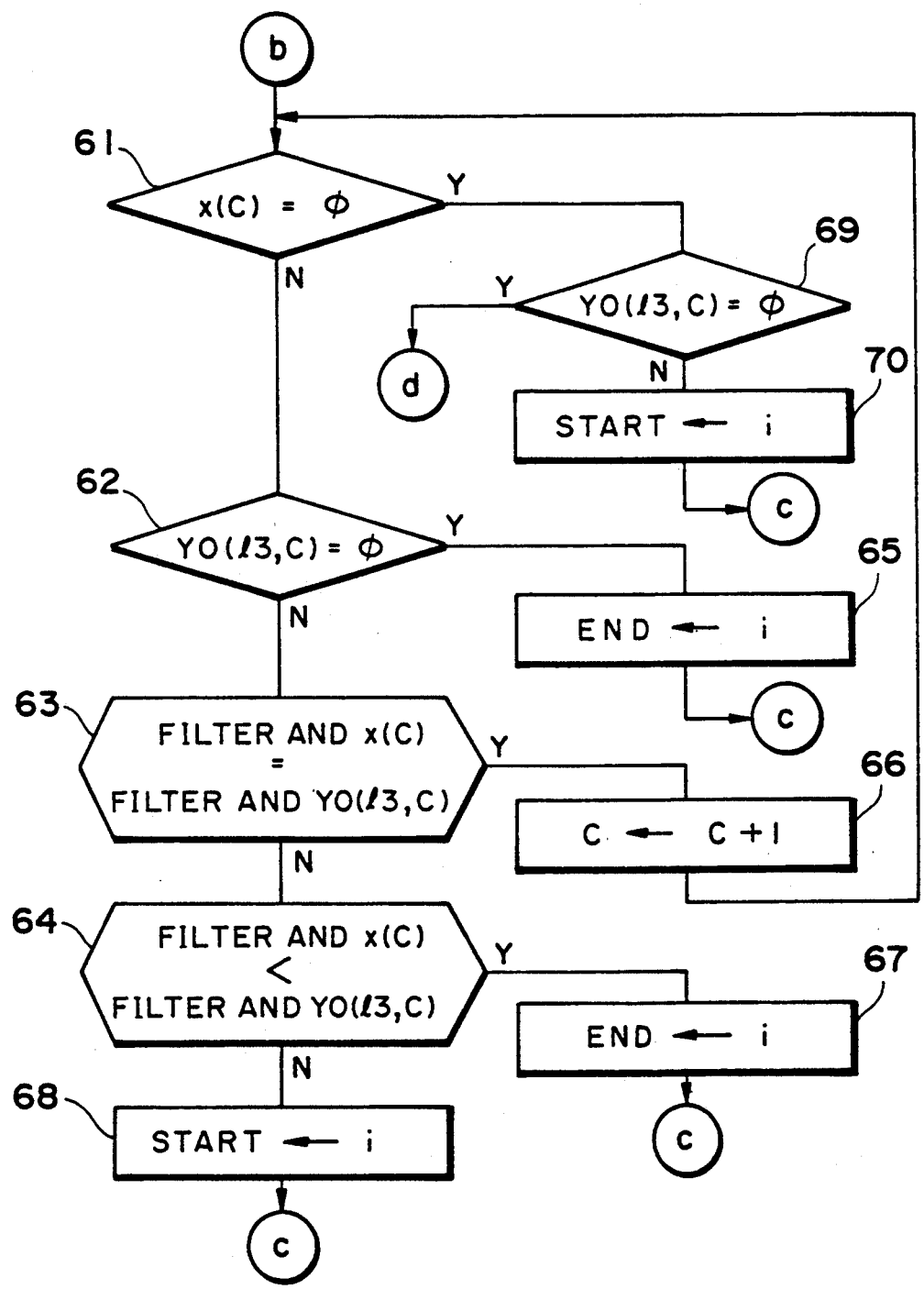
Figure 11:
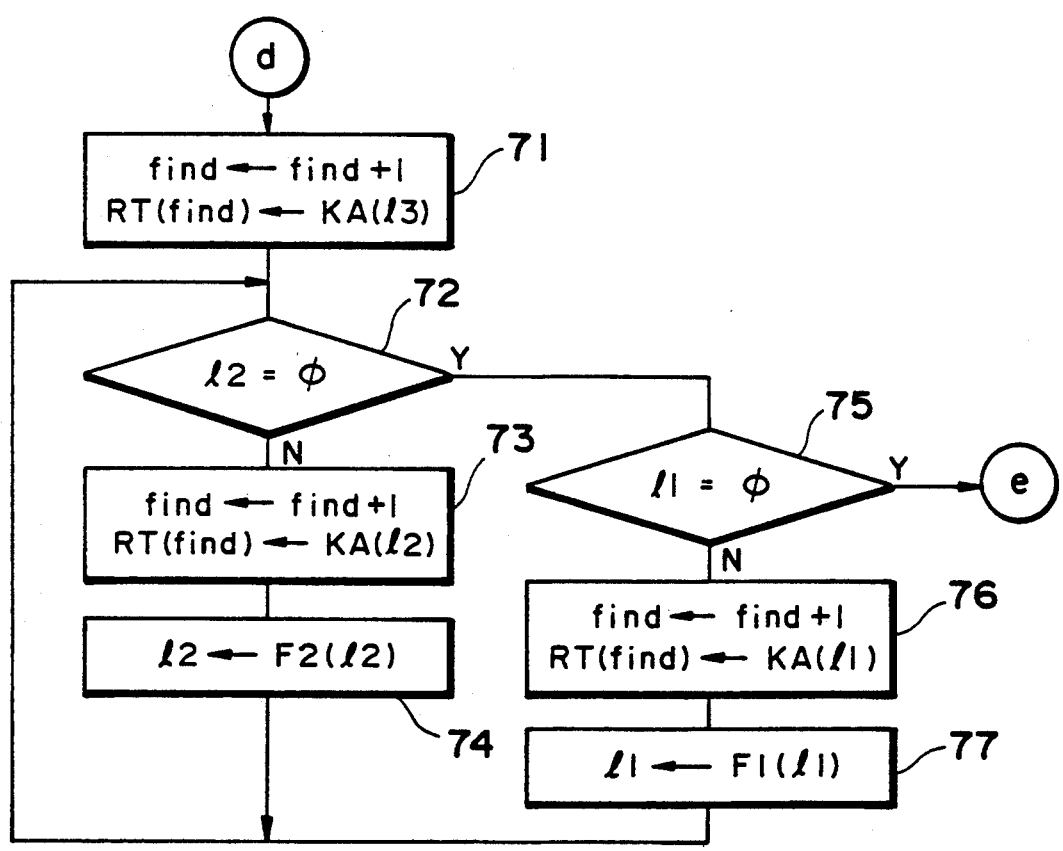

FIGS. 9 to 11 show the procedure for Chinese character retrieval processing particularly in the second mode. This processing is also applied to Chinese character retrieval processing in the first mode by setting the filter to "FFFF". In addition, this processing will be executed by the computer 10 shown in FIG. 1 or the Chinese character retrieval processor 17 shown in FIG. 2.

Figure 12:
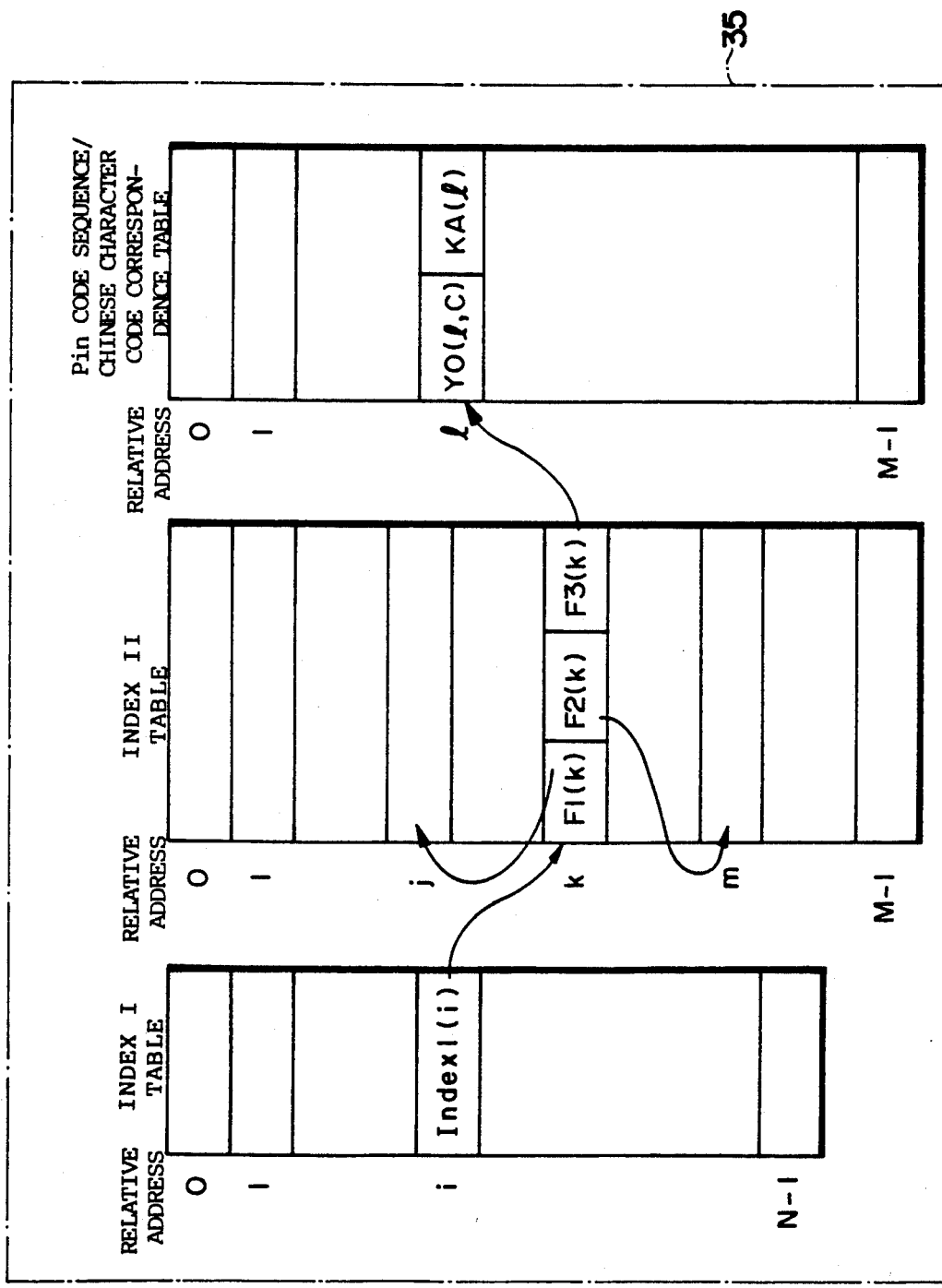
FIG. 12 illustrates the structure of a dictionary.

Prior to describing the Chinese character retrieval processing, description is made of the structure of the dictionary 35 with reference to FIGS. 12 and 13. As shown in FIG. 12, the dictionary 35 is provided with an index I table, an index II table, and an Yin code sequence/Chinese character code correspondence table.

As shown in FIG. 13, the Yin code sequence/Chinese character code correspondence table stores an Yin code sequence and a Chinese character code representing one or a plurality of Chinese characters constituting a word having a pronunciation indicated by the Yin code sequence in correspondence with each other. Although in FIG. 13, a Chinese character itself is illustrated in place of the Chinese character code for easy understanding, it should be understood that a code represented in binary notation is actually stored.

Since a word "中国)" (which means the Chinese)" is constituted by three Chinese characters, a corresponding Yin code sequence is composed of 6 bytes. A 4-byte Yin code sequence corresponds to a word constituted by two Chinese characters (for example, "中国"). A 2-byte Yin code sequence corresponds to one Chinese character. In such a manner, words whose leading Chinese characters ("中" in the above-mentioned example) are common are arranged in close proximity to each other, and the words are so arranged that the the larger the number of bytes composing an Yin code sequence corresponding to a word is, the smaller the value of a relative address is. In FIG. 13, a sign "φ" representing "0000" always exists in the end of the Yin code sequence.

One pronunciation may, in some cases, indicate not less than two Chinese characters. For example, both Yin code sequences with relative addresses 102 and 103 are "53f8", which corresponds to Chinese characters "中(which means center)", " (which means loyalty)" and the like.

A relative address in the Yin code sequence/Chinese character code correspondence table is expressed by l. In addition, an Yin code sequence with the relative address l is expressed by Y0 (l, 1), Y0 (l, 2) ... φ. Y0 (l, 1) Y0 (l, 2) and the like are generally expressed by Y0 (l, C) (C=1, 2, ... ). A Chinese character code with the relative address l is expressed by KA (l) (variable length).

The Yin code sequence/Chinese character code correspondence table stores as many words as possible (almost all words used in China, if possible). The words can be freely arranged except for the above-mentioned rule. Consequently, an arbitrary pair of an Yin code sequence and a Chinese character code can be arranged in an arbitrary storage location. Let M be the number of words arranged in the Yin code sequence/Chinese character code correspondence table.

Turning to FIG. 12, the index I table and the index II table are for allowing Yin code sequences arranged at random in the Yin code sequence/Chinese character code correspondence table to be retrieved in the order o numerical values thereof.

N Index I (i) are arranged in a constant order in the index I table. Index I (i) is a pointer to a corresponding element in the index II table which indicates a relative address in the index II table). N denotes the number of different Yin code sequences in the Yin code sequence/Chinese character code correspondence table. Since not less than two words can correspond to one Yin code sequence as described above, $N \leq M$ generally holds.

The index II table has M storage locations. Each of the storage locations stores three types of elements, F1 (k), F2 (k) and F3 (k), F3 (k) is a pointer to a corresponding Yin code sequence in the Yin code sequence/Chinese character code correspondence table which indicates a relative address in the correspondence table). F2 (k) indicates (a relative address of) another storage location in the index II table having F3 (k) pointing the same Yin code sequence as the Yin code sequence pointed by F3 (k) in the storage location where above F2 (k) is stored. Consequently, both words "中" and "忠" can be retrieved with respect to the Yin code sequence 53f8. When the same Yin code sequence does not exist in addition thereto, F2 (k)=φ is set. F1 (k) indicates (a relative address of) another storage location in the index II table having F3 (k) pointing an Yin code sequence including as its upper bits the same Yin code sequence as the Yin code sequence pointed by F3 (k) in the storage location where above F1 (k) is stored (that is, an Yin code sequence longer than the Yin code sequence pointed by F3 (k)). Consequently, when "中国" is retrieved, "中国人" including "中国" and having a larger number of Chinese characters is automatically retrieved.

Index (i) in the index I table are previously sorted in ascending order of numerical values represented by Yin code sequences in the Yin code sequence/Chinese character code correspondence table. Even if the Yin code sequences are arranged at random in the Yin code sequence/Chinese character code correspondence table, therefore, it seems as if the Yin code sequences are arranged in ascending order of numerical values thereof in the Yin code sequence/Chinese character code correspondence table as viewed through the index I table.

The Chinese character retrieval processing shown in FIGS. 9 to 11 uses the binary search or dichotomizing search method.

In this Chinese character retrieval processing, some variables are used. The variables include "START", "END", "find" and the like. The variables "START" and "END" are used for accessing the index I table. The variable "find" is used for pointing a storage location in a Chinese character code buffer (see FIG. 14) storing a Chinese character code found. The variables are realized as data stored in a register or a memory area.

Input Yin code sequences applied from the editing processing (see FIG. 6) or the editing processor 16 to the Chinese character retrieval processing or the Chinese character retrieval processor 17 are expressed by x (1), x (2), x (3), ..., For example, when "Zhong1 Guo2" is inputted according to the Pin Yin notation, the input Yin code sequence becomes "53f8 67b5 ". That is, x (1)=53f8, and x (2)=67b5. A Yin code counter C is used so as to indicate how many Yin codes are there before each of the Yin codes constituting the input Yin code sequence. For example, x (1) is indicated by x (C) (C=1).

In FIG. 9, the Yin code counter C is first initialized to 1 (C=1, step 51). Consequently, the first Yin code x (1) in the inputed Yin code sequence is designated.

Subsequently, the variables "START", "END", and "find" are respectively initialized to 0, (N−1) and, 0 (step 52).

A relative address in the index I table is calculated using the variables "START" and "END" as (START+END)/2, which is taken as i (step 54). This is processing for finding a relative address positioned right in the center on relative addresses in the index I table. The binary search or dichotomizing search is a search in which a series of relative addresses (generally, a set of items) is divided into two parts, either one of the parts is selected, and the selected part is further divided into two parts until an objective relative address (item) is reached (found).

The index I table is accessed using the relative address i obtained by the calculation, and Index (i) stored in a storage location having the relative address i is read out. This Index (i) is taken as k (step 55).

Subsequently, the index II table is accessed using Index (i)=k as a relative address, and the elements F1 (k), F2 (k), and F3 (k) stored in a storage location having the relative address are read out and are respectively taken as l1, l2 and l3 (step 56).

Referring to FIG. 10, the Yin code sequence/Chinese character code correspondence table is accessed using as a relative address the third element F3 (k)=l3 read out from the index II table, and an Yin code Y0 (l3, C) stored in a storage location having the relative address is read out When the second mode is selected, FILTER=FEFC is set (FIG. 6, step 45). The AND operation of this FILTER and the Yin code Y0 (l3, C) read out is executed. In addition, the AND operation Of the yin code x (C), which is designated by the Yin code counter C, in the input Yin code sequence and the FILTER is executed. The results of the two AND operations are compared with each other to determine whether or not they are equal to each other or which of them is larger.

As described in the foregoing, the Yin code sequences are arranged in ascending order of numerical values thereof in the Yin code sequence/Chinese character code correspondence table, as viewed through the index I table. Consequently, consider a case where the following expression (1) holds:

FILTER AND x(C) < FILTER AND Y0(l3, C)    (1)

In this case, the input Yin code x (C) is smaller than the Yin code Y0 (l3, C) read out, that is, x (C) to be searched for is stored in a storage location having a smaller relative address than that of Y0 (l3, C). In order to come closer to x (C), access to a storage location having a smaller relative address is required. That is, it is necessary to access the upper half of the index I table. Consequently i is substituted in the variable "END" (step 67), and the program is returned to the step 54 through the step 53.

Consider a case where the following expression(2) holds:

FILTER AND x(C) > FILTER AND Y0(l3, C)    (2)

In this case, i is substituted in the variable "START" (step 68), and the program is similarly returned to the step 54.

In such a manner, an Yin code which coincides with the input Yin code x (C) is retrieved in the Yin code sequence/Chinese character code correspondence table in accordance with the binary search or dichotomizing search.

Finally, consider a case where the following expression (3) holds:

FILTER AND x(C) = FILTER AND Y0(l3, C)    (3)

In this case, a storage location storing an objective Yin code x (C) is found in the correspondence table.

Assuming that the Yin code counter C is initialized to 1, that is, C=1, the Yin code counter C is then incremented so as to see whether or not the second input Yin code x (C) (C=2) and the second Yin code Y0 (l3, C) in the Yin code sequence in the correspondence table coincide with each other (step 66).

If the expression (3) does not hold in the Yin code counter C incremented, a search is made again in accordance with the binary search or dichotomizing search depending on which of the expression (1) and the expression (2) holds (steps 64, 67 and 68). If the expression (3) holds in C=1, an objective Yin code should exist in the vicinity of the Yin code Y0 (l3, C) found in the correspondence table. Accordingly, the vicinity may be searched without specially using the binary search or dichotomizing search. Alternatively, a search can be also made utilizing the element F1 as described later.

When the Yin code counter C is incremented while finding the Yin code Y0 (l3, C) in a case where the expression (3) holds until the search is terminated with respect to all Yin codes in the input Yin code sequence and finally, x (C)=φ holds (step 61), it is examined whether or not Y0 (l3, C)=φ also holds in the Yin code in the Yin code sequence in the correspondence table (step 69). If the Yin code Y0 (l3, C) is φ, an Yin code sequence which coincides with the input Yin code sequence is found, so that the program proceeds to processing shown in FIG. 11. On the other hand, if the Yin code Y0 (l3, C) is not φ, an objective Yin code sequence exists in a storage location having a larger relative address than that of the storage location. Accordingly, the storage location having a larger relative address continues to be searched (step 70). Since the Yin code sequence including the entire input Yin code sequence is found (for example, an attempt to find out " 中国 " causes " 中 " to be found), however, an objective Yin code sequence should exist close thereto. Consequently, if relative addresses in the correspondence table are incremented one at a time. an objective Yin code sequence should be immediately found.

Furthermore, when the Yin code Y0 (;3, C) read out becomes φ although x (C) is not φ yet (for example, an attempt to find out "    " causes "    " to be found) (step 62), a storage location having a smaller relative address is then searched (step 65). Also in this case, an objective character code sequence should exist close to the storage location which is reached. Accordingly, the relative addresses in the correspondence table are decremented one at a time, thereby to make it possible to quickly find an objective character code sequence.

Description is now made of the sense of FILTER=-FEFC with reference to FIG. 15. For example, if an AND operation of an Yin code representing Sheng Yun "Zhong" including any one of Yi Sheng, Er Sheng, Shan Sheng and Si Sheng and FILTER=FEFC is executed, the Yin code is converted into an Yin code representing Sheng Yun "Zhong" including no Sheng Diao. Consequently, when a Chinese character is retrieved under the second mode, all Chinese characters having the same Sheng Yun irrespective of the presence or absence of Sheng Diao are found. This state is shown in FIG. 16. Whether "Zhong1 Guo2" including Sheng Diao or "Zhong Guo" including no Sheng Diao is inputted, the expression (3) holds with respect to a word "中国" by passing the input Yin code through the FILTER (in both C=1 and C=2), so that this word is found. In this sense, the Yin code is passed through the FILTER in the processing in the steps 63 and 64.

The filter need not be necessarily employed in the first mode. Alternatively, the input Yin code and the Yin code in the correspondence table may be directly compared with each other. If FILTER=FFFF is used, the steps 63 and 64 and the expressions (1) to (3) can be utilized without any modification.

If an Yin code sequence which coincides with the input Yin code sequence is found out (through the FILTER) (step 69), the variable "find" is incremented so that a storage location in the Chinese character code buffer is designated, and a Chinese character code KA (13) stored in correspondence with the Yin code sequence found is read out from the Yin code sequence/Chinese character code correspondence table and is stored in the storage location, which is designated by the variable "find", in the Chinese character code buffer, with reference to FIG. 11 (step 71).

Subsequently, the correspondence table is accessed utilizing the second element F2 (k) in the index II table on the basis of the element F3 (k) in another storage location in the index 11 table pointing Yin code sequences having the same pronunciation in the correspondence table, and Chinese character codes having the same pronunciation stored therein are stored in the Chinese character code buffer after the variable "find" is incremented to designate a new storage location (step 73). The Chinese character codes having the same pronunciation which are linked by the element F2 (k) are sequentially read out to be stored in the Chinese character code buffer (the steps 73 and 74 are repeated). Consequently, " 忠 " and the like are found as candidate Chinese characters in addition to " 中 ".

If F2 (k)=12=φ holds (step 72), an Yin code sequence including the input Yin code sequence and longer than the input Yin code sequence is retrieved using the element F1 (k)=11. A Chinese character code accessed by the element F3 (k) stored in another storage location (the second storage location) in the index II table pointed by the element F1 (k) is read out from the correspondence table, and is stored in the Chinese character code buffer after the the variable "find" is incremented (step 76). If there is still another storage location linked by the element F1 (k) in the second storage location, a Chinese character code accessed by the element F3 (k) in the above-mentioned storage location is read out and is stored in the Chinese character code buffer in the same manner (steps 75 to 77). If F1 (k)=11=φ holds, all processing is terminated (step 75).

Furthermore, when the binary search or dichotomizing search is repeated until START+1≧END finally holds, it is considered that a Yin code sequence corresponding to the input Yin code sequence is not found, so that the Chinese character retrieval processing is terminated (step 53).

FIG. 17 shows the hardware architecture realizing the above-mentioned processing, which illustrates an example of the construction of the Chinese character retrieval processor 17.

An Yin code sequence/Chinese character code correspondence table 81 is the same as that shown in FIG. 12 or 13. A retrieving and reading circuit 82 is for reading out Yin code sequences sequentially or by referring to an input Yin code sequence from the correspondence table 81. A filter register 83A and a filter register 83B respectively store data FFFF and data FEFC. A multiplexer 84 respectively selects a register 83A and a register 83B in the first mode and the second mode in accordance with the selection of a conversion mode by a conversion mode key 24, and applies filter data stored therein to AND circuits 85 and 86.

An input Yin code sequence and an Yin code sequence read out from the correspondence table 81 are respectively applied to the AND circuits 85 and 86. The AND circuits 85 and 86 respectively filter the input Yin code sequence and the read Yin code sequence, and their output data are compared with each other in a comparing circuit 87. The comparing circuit 87 outputs a coincidence signal only when the two input data coincide with each other. A gate 88 is enabled in response to this coincidence signal. In addition, the coincidence signal is applied to the retrieving and reading circuit 82. The retrieving and reading circuit 82 reads out from the correspondence table 81 all Chinese character codes corresponding to Yin codes which coincide with each other and applies the same to the gate 88. Accordingly, the Chinese character codes are stored in a Chinese character code buffer 89 through the gate 88.

Although in the above-mentioned embodiment, Chinese characters are retrieved by including Sheng Diao and ignoring Sheng Diao using the filters FFFF and FEFC in the first mode and the second mode, Chinese characters can be also retrieved using still another filter in another mode. For example, if a filter OOFC in hexadecimal notation is used, it will be possible to retrieve all Chinese characters having an Yin code which coincides with an input Yin code in Sheng Mu can be retrieved.

Furthermore, the input device is not limited to the keyboard. For example, it may be one for inputting a pronunciation itself. In this case, a voice recognition unit for converting an electric signal representing a pronunciation into a corresponding Yin code will be utilized.

Although the present invention has been described and illustrated in detail, it is clearly understood that the same is by way of illustration and example only and is not to be taken by way o limitation, the spirit and scope of the present invention being limited only by the terms of the appended claims.

What is claimed is:

1. An apparatus for converting a phonetic transcription of Chinese into a Chinese character, comprising:
   an input device capable of inputting input data representing a pronunciation of Chinese according to one of a plurality of types of notation;
   a plurality of conversion tables respectively corresponding to the plurality of types of notation for converting said input data into a Yin code corresponding to a pronunciation indicated by the input data;
   a dictionary that stores an Yin code and a Chinese character code representing a Chinese character having a pronunciation corresponding to the Yin code;
   control means for converting the input data inputted from said input device into an Yin code using one of said plurality of conversion tables and retrieving from said dictionary a Chinese character code corresponding to the Yin code obtained by the conversion; and filtering means for masking a predetermined one of a plurality of bits composing an Yin code;

said control means supplying an Yin code corresponding to input data and an Yin code from said dictionary to said filtering means and then, comparing the resulting filtered Yin codes with each other, said control means searching said dictionary in accordance with said comparison for an Yin code which coincides with the Yin code corresponding to the input data.

2. The apparatus according to claim 1, which further comprises input mode selecting means for selecting any one of said plurality of types of notation, said control means converting said input data into an Yin code in accordance with one of said conversion tables corresponding to the notation selected by said input mode selecting means.

3. The apparatus according to claim 1, wherein said control means judges the notation on the basis of input data inputted from said input device and selects a conversion table to be used in accordance with the judgment.

4. The apparatus according to claim 1, wherein said input device comprises a device for converting an input voice into a voice electric signal and a speech recognition device for recognizing a pronunciation on the basis of the voice electric signal and converting the voice electric signal into an Yin code.

5. The apparatus according to claim 1, which further comprises:

means for converting a Chinese character code into display data representing a Chinese character represented by the Chinese character code; and 'a device for displaying the Chinese character on the basis of the display data.

6. The apparatus according to claim 5, wherein said control means supplies a plurality of candidate Chinese character codes to said converting means in response to said Yin code, the apparatus further comprising:

designating means for designating any one of a plurality of displayed candidate Chinese characters corresponding to said plurality of candidate Chinese character codes; and a memory for storing a Chinese character code representing the designated Chinese character.

7. The apparatus according to claim 1, wherein:

each of said conversion tables converts input data into an Yin code corresponding to one Chinese character, said dictionary stores an Yin code sequence and a Chinese character code in correspondence with each other with respect to a word comprising at least one Chinese character, and said control means partitions input data inputted from said input device for each Chinese character and converts the partitioned input data into a corresponding Yin code, arranges the corresponding Yin code after the conversion for said at least one Chinese character of said word to form an Yin code sequence, and retrieves from said dictionary a Chinese character code corresponding to the Yin code sequence.

8. An apparatus for converting a phonetic transcription of Chinese into a Chinese character, comprising:

converting means for converting inputted data indicating a pronunciation of Chinese into a Yin code corresponding to the pronunciation;

a dictionary that stores an Yin code and a Chinese character code representing a Chinese character having a pronunciation corresponding to the Yin code;

filtering means for masking a predetermined one of a plurality of bits composing an Yin code; and control means for supplying the Yin code obtained from said converting means and the Yin code in said dictionary to said filtering means and then, comparing the resulting filtered Yin codes with each other, said control means retrieving, in accordance with said comparison, an Yin code from said dictionary which coincides with the Yin code obtained from said converting means, said control means reading out from said dictionary a Chinese character code corresponding to the Yin code which coincides with the Yin code obtained from said converting means.

9. The apparatus according to claim 8, wherein said Yin code comprises bits representing Sheng Mu, bits representing Yun Mu, and bits representing Sheng Diao.

10. The apparatus according to claim 9, wherein said filtering means masks at least one of the bit representing Sheng Mu, the bit representing Yun Mu, and the bit representing Sheng Diao.

11. The apparatus according to claim 8, wherein said filtering means selectively allows the Yin code to direct pass.

12. The apparatus according to claim 8, which further comprises an input device capable of inputting a pronunciation of Chinese according to a plurality of types of notation, said converting means comprising a plurality of conversion tables corresponding to the plurality of types of notation for converting said input data into an Yin code corresponding to a pronunciation indicated by the input data.

13. The apparatus according to claim 8, wherein said converting means is speech recognizing means for recognizing a pronunciation on the basis of a voice input signal and outputting an Yin code corresponding to the pronunciation.

14. The apparatus according to claim 8, which further comprises retrieval mode selecting means for selecting the presence or absence of the use of the filtering means for any one of the plurality of bits composing the Yin code.

15. The apparatus according to claim 12, which further comprises input mode selecting means for selecting any one of the plurality of types of notation, said converting means converting input data into an Yin code using a conversion table related to the type of notation selected by said input mode selecting means.

16. The apparatus according to claim 8, which further comprises:

means for converting a Chinese character code into display data representing a Chinese character represented by the Chinese character code; and a device for displaying the Chinese character on the basis of the display data.

17. The apparatus according to claim 16, wherein said control means supplies a plurality of candidate Chinese character codes to said converting means in response to said Yin code, the apparatus further comprising:

designating means for designating any one of a plurality of displayed candidate Chinese characters corresponding to said plurality of candidate Chinese character codes; and a memory for storing a Chinese character code representing the designating Chinese character.

18. The apparatus according to claim 8, wherein:

said converting means converts input data into an Yin code corresponding to one Chinese character, said dictionary stores an Yin code sequence and a Chinese character code in correspondence with each other with respect to a word comprising at least one Chinese character, and said control means controls said converting means so as to partition input data for each Chinese character and convert the same into a corresponding Yin code, arranges the corresponding Yin code after the conversion for said at least one Chinese character of said word to form an Yin code sequence, and retrieves from said dictionary a Chinese character code corresponding to the Yin code sequence.

19. A method of converting a phonetic transcription of Chinese into a Chinese character, comprising the steps of:

inputting input data representing a pronunciation of Chinese according to one of a plurality of types of notation;

storing a plurality of conversion tables respectively corresponding to the plurality of types of notation, said predetermined conversion tables for converting said input data into an Yin code corresponding to a pronunciation indicated by the input data;

storing a dictionary having an Yin code and a Chinese character code representing a Chinese character having a pronunciation corresponding to the Yin code;

converting the input data into an Yin code using one of said plurality of conversion tables;

masking predetermined bits composing said Yin code of said conversion and said Yin code from said dictionary; and retrieving from said dictionary a Chinese character code corresponding to a comparison of the filtered Yin code.

20. A method of converting a phonetic transcription of Chinese into a Chinese character, comprising the steps of:

storing a dictionary having an Yin code and a Chinese character code representing a Chinese character having a pronunciation corresponding to the Yin code;

converting inputted data representing a pronunciation of Chinese into an Yin code corresponding to the pronunciation; and filtering the Yin code obtained by the conversion and the Yin code in said dictionary by masking a predetermined one of a plurality of bits of the Yin codes and then, comparing the filtered Yin codes with each other, retrieving from said dictionary an Yin code which coincides with the Yin code obtained by the conversion, and reading out from said dictionary a Chinese character code corresponding to the Yin code which coincides with the Yin code obtained by the conversion.

* * * * *